(12) United States Patent
Gai et al.

(10) Patent No.: US 6,418,500 B1
(45) Date of Patent: Jul. 9, 2002

(54) FEEDBACK CONTROL FOR TERMINATION ADJUSTMENT

(75) Inventors: Weixin Gai, Santa Clara, CA (US); Hirotaka Tamura, Atsugi (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/249,009

(22) Filed: Feb. 12, 1999

(51) Int. Cl.$^7$ .......................... G06F 13/40; H03K 17/16
(52) U.S. Cl. ......................................... 710/305; 326/30
(58) Field of Search ............................ 326/30; 710/126

(56) References Cited

U.S. PATENT DOCUMENTS

| | | | | |
|---|---|---|---|---|
| 3,558,933 A | * | 1/1971 | Meyer | 327/261 |
| 4,027,259 A | * | 5/1977 | Zellmer | 333/28 R |
| 4,228,369 A | * | 10/1980 | Anantha et al. | 327/111 |
| 4,859,877 A | * | 8/1989 | Cooperman et al. | 326/30 |
| 5,585,741 A | * | 12/1996 | Jordan | 326/30 |
| 5,726,582 A | * | 3/1998 | Hedberg | 326/30 |
| 5,802,390 A | * | 9/1998 | Kashiwagi et al. | 710/1 |
| 5,926,031 A | * | 7/1999 | Wallace et al. | 326/30 |

* cited by examiner

*Primary Examiner*—Sumati Lefkowitz
(74) *Attorney, Agent, or Firm*—Fenwick & West, LLP (57) ABSTRACT

A termination system includes a termination element, a reference resistance system, and a feedback control system. The termination element includes one or more transfer gates. The transfer gates are comprised of one or more transistors that provide some resistance value that is dependent upon which transistors are in an on state or an off state. The termination element is connected to a driver system and an electrical signal line. The reference resistance system is used to provide a reference resistance value that is substantially equivalent to a line characteristic impedance of the electrical signal line. The feedback control system is connected to the reference resistance system and the termination element. The feedback control system uses the reference resistance system to generate an adjustment signal for the termination element so that the resistance value of the termination element substantially matches the line characteristic impedance of the electrical signal line. The adjustment signal places the transistors of the transfer gate in an on state or an off state so that the resistance value of the termination element is accordingly matched to the line characteristic impedance. In addition, a method for adjusting a resistance value of a terminator element is described. A method for generating an adjustment signal is also described.

17 Claims, 8 Drawing Sheets

FEEDBACK CONTROL FOR TERMINATION ADJUSTMENT

BACKGROUND OF THE INVENTION

1. Field of the Invention

The present invention relates to electrical terminators, and more specifically, to a terminator system for use in signal communication between a sending circuit and a receiving circuit.

2. Description of the Related Art

High speed data communication integrated circuit chips are known. A conventional high speed data communication integrated circuit chip includes a receiver and a driver. The driver of one conventional high speed data communication chip connects to a receiver of another high speed data communication chip through a chip communication signal line.

The driver of the sending data communication chip is connected to the chip communication signal line through a conventional electrical terminator. Similarly, the receiver on the receiving communication chip is also connected to the communication signal line through a conventional electrical terminator. An on-chip conventional electrical terminator consists of multiple transfer gates that gate an electrical signal from the driver onto the communication signal line or receive the electrical signal from the communication signal line and gate it to the receiver.

The conventional electrical terminator includes a fixed resistance value that tries to match the signal line characteristic impedance. If the resistance value changes, however, the resistance value of the conventional terminator is unable to match the signal line characteristic impedance of the communication signal line. This significantly reduces the reliability of communication signals sent between the driver and the receiver. For example, there may be up to fifty percent degradation in a communication signal sent between the driver and the receiver when the resistance value of a terminator does not match the line characteristic impedance of the communication signal line.

A problem with conventional terminators is that they are not consistently reliable for transmitting data because the resistance value of the terminator can change due to a variety of conditions. For example, the resistance of the transfer gates is highly dependent upon the different manufacturing processes used to create them. This results in different resistance values for each manufactured conventional terminator. Different resistance values for each different manufacturer degrades data passing through the conventional terminator because the line characteristic impedance of the signal line to connect two conventional terminators may only match one conventional terminator and not the other or may not match either conventional terminator.

Another problem with conventional terminators is that the resistance value may vary depending on the supply voltage used with the transfer gates. When the supply voltage changes, the resistance value of the conventional terminator also changes. Therefore, for communication chips that may be connected to a variety of supply voltage sources, there may be a degradation of data transferred through the conventional terminators due to resistance value fluctuations.

Another problem with conventional terminators is that they are highly sensitive to on-chip temperature. As the on-chip temperature changes, the resistance value of the conventional terminator also changes. For example, as the clock speed for high speed communication integrated circuit chips increases, the chip temperature also increases. This causes the terminator resistance value to change so that there is a degradation of data passing through the conventional terminator.

In every instance where there is a change in the resistance value of the conventional terminator, the result is a degradation of performance of the integrated circuit chip. For example, there may be a decrease in communication signal quality, a decrease in communication signal accuracy leading to a decrease in communication speed, and/or a decrease in overall chip speed because communication signals must be re-transmitted.

Therefore, there is a need for an electrical system having an electrical termination system that provides (1) consistent resistance characteristics and that (2) may be used in a variety of electrical circuits and systems where there must be a match between the impedance characteristics of an electrical signal line and the sending and/or receiving circuits and systems.

SUMMARY OF THE INVENTION

A system and a method in accordance with the present invention satisfies a need for matching a resistance value of a termination element to a line characteristic impedance of an electrical signal line. A system and a method in accordance with the present invention also satisfies a need for generating an adjustment signal for adjusting a resistance of a termination system.

The present invention includes a termination system in an electrical system in accordance with the present invention. The electrical system may be an integrated circuit microchip or chip. The chip may be, for example, a high speed data communication integrated circuit chip or a router integrated circuit chip that drives or receives electrical signals to or from another chip or chips, for example, other router integrated circuit chips.

A termination system in accordance with the present invention includes a termination element, a reference resistance system, and a feedback control system. The termination element includes one or more transfer gates. Each transfer gate may be comprised of one or more transistor elements, for example, MOSFET transistor elements or BJT transistor elements. The termination element is connected to a driver system and an electrical signal line. The reference resistance system provides a resistance value that is substantially equivalent to a line characteristic impedance of the electrical signal line. The feedback control system is connected to the reference resistance system and the termination element.

A resistance value of the termination element is matched to the line characteristic impedance of the electrical signal line so that the electrical signal can be sent from the driver system through the electrical signal line without electrical reflection. Reducing or eliminating electrical reflection maintains the accuracy and quality of the electrical signal. To match the resistance of the termination element to the impedance of the electrical signal line, the feedback control system generates an adjustment signal that accordingly adjusts the resistance of the termination element. It is noted that the electrical signal line may be any conduction line, for example, a wire, a cable, a PCB trace, a chip etching, or the like.

To generate the adjustment signal, the feedback control system uses the reference resistance system that has a resistance that is substantially equivalent to the line characteristic impedance of the electrical signal line. The feedback control system can continuously compare an on-chip resistance to the resistance of the reference resistor system. Using this comparison, the feedback control system can increment or decrement the adjustment signal accordingly to switch on or switch off transfer gates in the termination element. By switching transistors of the transfer gates on or off, the resistance of the termination element can be matched to the line characteristic impedance of the electrical signal line.

A feedback control system in accordance with the present invention includes a comparison system, a counter system, and a termination control code filter. The comparison system includes an on-chip resistance system that is connected to the reference resistance system. The comparison system is connected to the counter system. The counter system is connected to the termination control code filter and the on-chip resistance system in the comparison system. The terminator control filter is connected to the termination element.

The on-chip resistance system includes one or more transistor elements that provide a variable resistance depending on whether they are in an on state or an off state. The comparison system compares the resistance value of the variable on-chip resistance system to the resistance value of the reference resistance system. Based on this comparison, the comparison system generates a comparison signal that is sent to the counter system. If the resistance of the on-chip resistance system is less than the resistance of the reference resistance system, the comparison signal is a down signal. If the resistance of the on-chip resistance system is greater than the resistance of the reference resistance system, the comparison signal is an up signal.

The counter system receives the comparison signal and generates a control code. The control code is an increasing counter signal if the up signal is received and is a decreasing counter signal if a down signal is received. The termination code control filter receives the control code and generates the adjustment signal for the termination element. Specifically, if the control code is an increasing counter signal, the transistors in the termination element are turned on so that their resistance is decreased to match the line characteristic impedance of the electrical signal line. If the control code is a decreasing counter signal, the transistors in the termination element are turned off so that their resistance is increased to match the line characteristic impedance of the electrical signal line.

The present invention allows for signal transmission having increased quality and accuracy because the on-chip resistance value of the termination elements can be advantageously matched to the line characteristic impedance of the electrical signal lines coupled to the terminators. Moreover, the present invention increases overall system speed and efficiency because there is no signal reflection, and therefore signal quality is high and accurate.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

A preferred embodiment of the present invention will be described with reference to the Figures, where like reference numbers may indicate identical or functionally similar elements. The present invention includes a system and a method for matching a resistance of a terminator element with a line characteristic impedance of an electrical signal transmission line (or electrical signal line).

Figure 1:
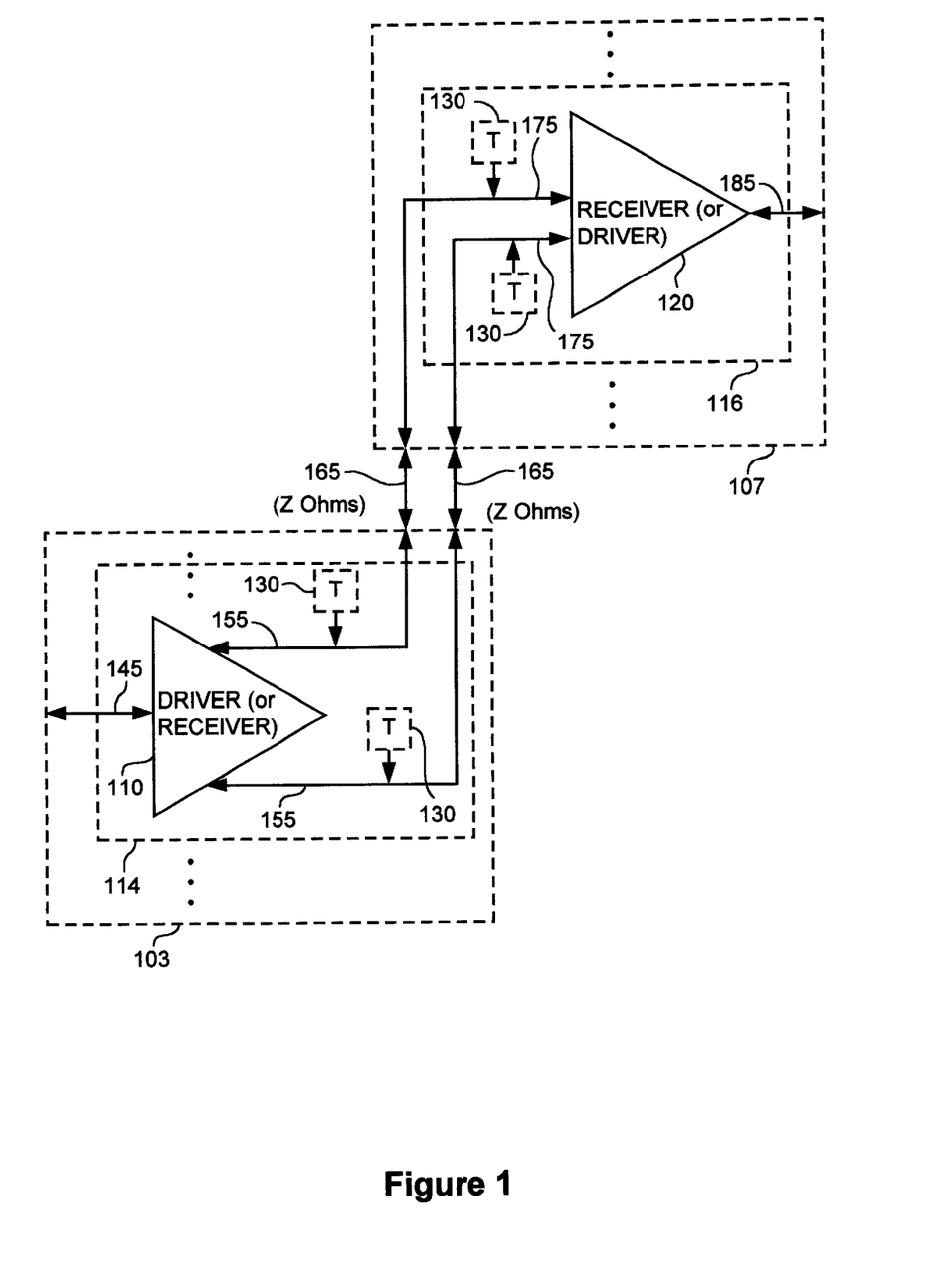
FIG. 1 is a general block diagram of an electrical transmission system between two electrical systems in accordance with the present invention.

FIG. 1 is a general block diagram of an electrical transmission system 101 between two general electrical systems 103, 107 in accordance with the present invention. Both the first general electrical system 103 and the second general electrical system 107 include at least one driver or receiver system (driver/receiver system) 114, 116 and at least one general electrical signal transmission line 165 having an impedance of Z Ohms, where Z is a numerical value.

The driver/receiver system 114 of the first general electrical system 103 couples to the driver/receiver system 116 in the second general electrical system 107 through the general electrical transmission signal lines 165. It is noted that the first electrical system 103 and the second electrical system 107 may be integrated circuit chips. In addition, the electrical transmission signal lines 165 may be, for example, a wire, a cable, a PCB trace, a chip etching, or other line that allows for transmission of signals.

Each driver/receiver system 114, 116 includes an input/output signal line 145, 185, a driver/receiver 110, 120, at least one driver/receiver signal line 155, 175, and at least one termination element 130. It is noted that the termination element 130 may be optional in either driver/receiver system 114, 116. Generally, in the first driver/receiver system 114 the input/output signal line 145 is coupled to the driver/receiver 110. The driver/receiver 110 couples to each driver/receiver signal line 155. Each driver/receiver signal line 155 couples to the termination element 130 and the electrical signal transmission line 165.

The termination elements 130 in the driver/receiver system 114 of the first general electrical system 103 couple to the termination elements 130 in the driver/receiver system 116 of the second general electrical system 107, through the general electrical signal transmission lines 165, and the respective driver/receiver signal lines 155, 175. In the driver/receiver system 116 in the second general electrical system 107, the termination elements 130 couple the driver/receiver 120 through the driver/receiver signal lines 175. The driver/receiver 120 couples to the input/output signal line 185.

The input/output signal lines 145, 185, the driver/receiver signal lines 155, 175, and the general electrical transmission signal lines 165 are bi-directional signal lines. Each terminator 130 can operate when the driver/receive 110, 120 is sending or receiving electrical signals. Further, each driver/receiver 110, 120 functionally operates in a driver mode or a receiver mode. Therefore, when a signal is passed from the first general electrical system 103 to the second general electrical system 107, the driver/receiver system 114 in the first general electrical system 103 functionally operates as a driver system and the driver/receiver system 116 in the second general electrical system 107 functionally operates as a receiver system.

Figure 2A:
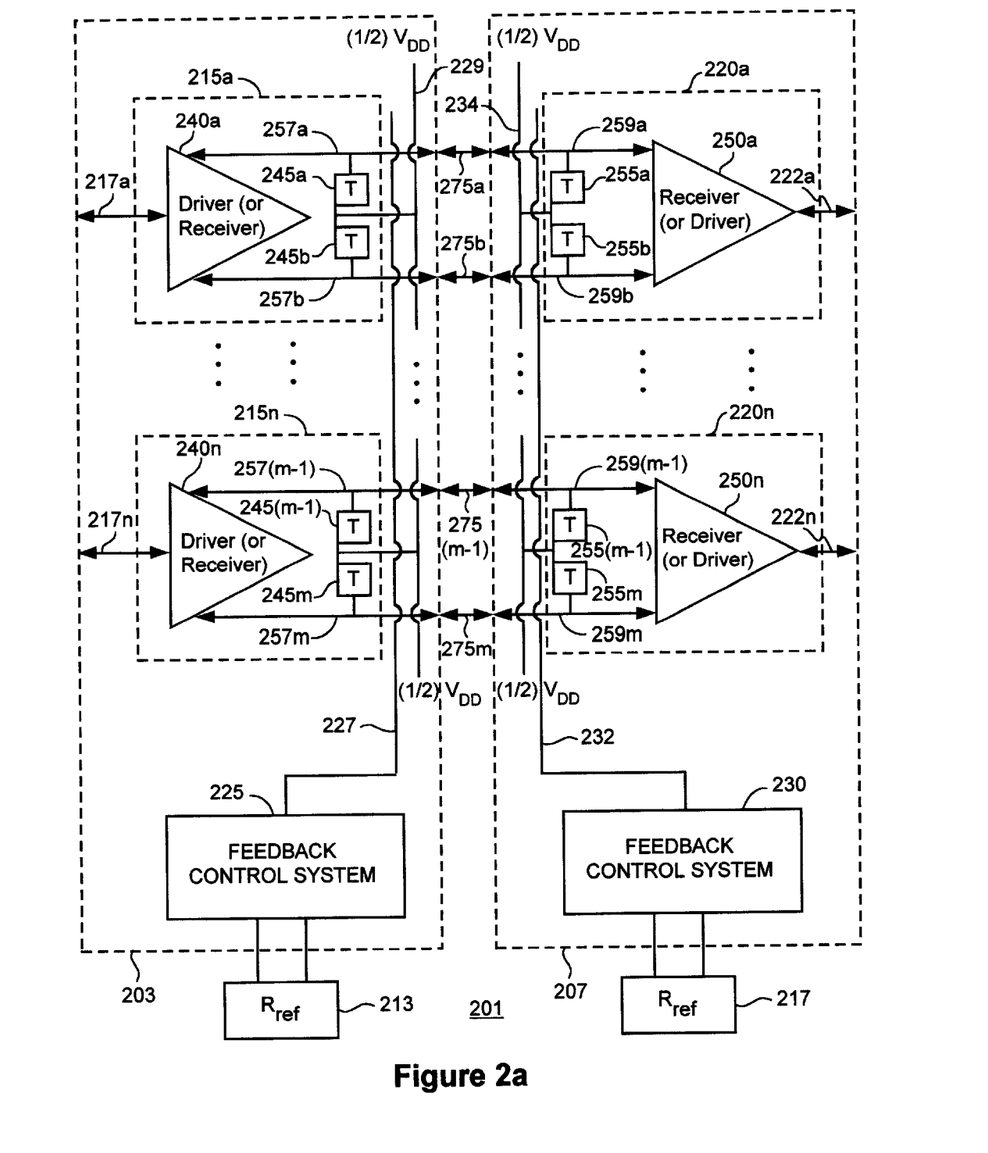
FIG. 2a is a block diagram of one embodiment of a termination system in an electrical transmission system in accordance with the present invention.

FIG. 2a is a block diagram of one embodiment of a termination system in an electrical transmission system 201 in accordance with the present invention. The electrical transmission system 201 includes a first electrical system 203, a second electrical system 207, and one or more electrical transmission signal lines (electrical signal lines) 275. It is noted that in one embodiment, the first electrical system 203 may be, for example, a first integrated circuit chip and the second electrical system 207 may be, for example, a second integrated circuit chip.

Each integrated circuit chip may be, for example, a high-speed data communication integrated circuit chip, a router integrated circuit chip, or other processing chip capable of formatting electrical signals. For example, a router integrated circuit chip drives electrical signals to or receives electrical signals from another integrated circuit chip or chips, for example, other router integrated circuit chips. In addition, the electrical transmission signal lines 275 may be, for example, a wire, a cable, a PCB trace, a chip etching, or other line that allows for transmission of signals.

The first electrical system 203 couples to the second resistance system 207 through the one or more electrical transmission signal lines 275. A first reference resistance system 213 couples to the first electrical system 203. A second reference resistance system 216 couples to the second electrical system 207.

Similar to the general electrical transmission signal lines 165 described above, the electrical transmission signal lines 275 are bi-directional and have an impedance of Z Ohms, where Z is a numerical value. Also, similar to the general electrical transmission system 101, the first electrical system 203 and the second electrical system 207 of the electrical transmission system 201 (including the internal elements, e.g., termination elements, signal lines, etc.) are bi-directional.

For ease of understanding the electrical transmission system 201 in accordance with the present invention will be described where the first electrical system 203 will be referenced as a driving system 203 and the second electrical system 207 will be referenced as the receiving system 207. One skilled in the art will recognized that the principles of operation remain consistent when the first electrical system 203 is operated in a receiving mode and the second electrical system 207 is operated in a driving mode.

The driving system 203 includes at least one driver system 215a, 215n (generally 215), a feedback control system 225, and a supply voltage rail 229. Each driver system 215a, 215n includes an input signal line 217a, 217n (generally 217), a driver 240a, 240n (generally 240), at least one termination element 245a, 245m (generally 245), and driver signal lines 257. It is noted that in one embodiment a termination system includes the termination elements, e.g., 245a, 245b, and the feedback control system 225 with the reference resistance system 213.

Each input signal line 217 couples to its respective driver system 215. Specifically, each input signal line 217 is coupled to the driver 240 within the driver system 215. Each driver 240 couples to a driver/receiver signal line 257a-257m (generally 257). Each driver/receiver signal line 257 couples to an electrical transmission signal line (electrical signal line) 275a-275m (generally 275). Each driver/receiver signal line 257 also couples to a respective termination element 245a-245m (generally 245). Each termination element 245 also couples to the voltage supply rail 229. The voltage supply rail 229 provides a supply voltage of ½ $V_{DD}$, for example, to the termination elements 245. In an alternative embodiment, a driver/receiver signal line 257 may be coupled to a terminator 245 that, in turn, is coupled to the electrical transmission signal line 257.

Each termination element 245 also couples to the feedback control system 225 through feedback (adjustment) signal line 227. The feedback control system 225 couples to the reference resistance system 213, which preferably is external (off-chip) to the driving system 203. In an alternative embodiment the reference resistance system 213 may be internal (on-chip) to the driving system 203.

The receiving system 207 includes at least one driver system 220a, 220n (generally 220), a feedback control system 230, and a supply voltage rail 234. Each driver system 220a, 220n includes an input signal line 222a, 222n (generally 222), a driver 250a, 250n (generally 250), at least one termination element 255a, 255m (generally 255), and receiver signal lines 259. It is noted that the driver system 220, is referenced as "driver" generically. It also includes a receiver system and operates in either a driver mode or a receiver mode.

Each input signal line 222 is coupled to its respective driver system 220. Specifically, each input signal line 222 couples to the driver 250 within the driver system 220. Each driver 250 couples to a driver/receiver signal line 259a-259m (generally 259). Each driver/receiver signal line 259 couples to a respective electrical transmission signal line 275. Each driver/receiver line 259 also couples, respectively, to at least one termination element 255a-255m (generally 255) T. Each termination element 255 couples the voltage supply rail 234. The voltage supply rail 234 provides a supply voltage of ½ $V_{DD}$, for example, to the termination elements 255. In an alternative embodiment, a driver/receiver signal line 259 may couple to a termination element 259 that couples to an appropriate electrical transmission signal line 275.

Each termination element 255 also couples to the feedback control system 230 through feedback (or adjustment) signal line 232. The feedback control system 230 couples to the reference resistance system 216, which preferably is external (off-chip) to the receiving system 207. In an alternative embodiment the reference resistance system 216 may be internal (on-chip) to the receiving system 207.

Figure 2B:
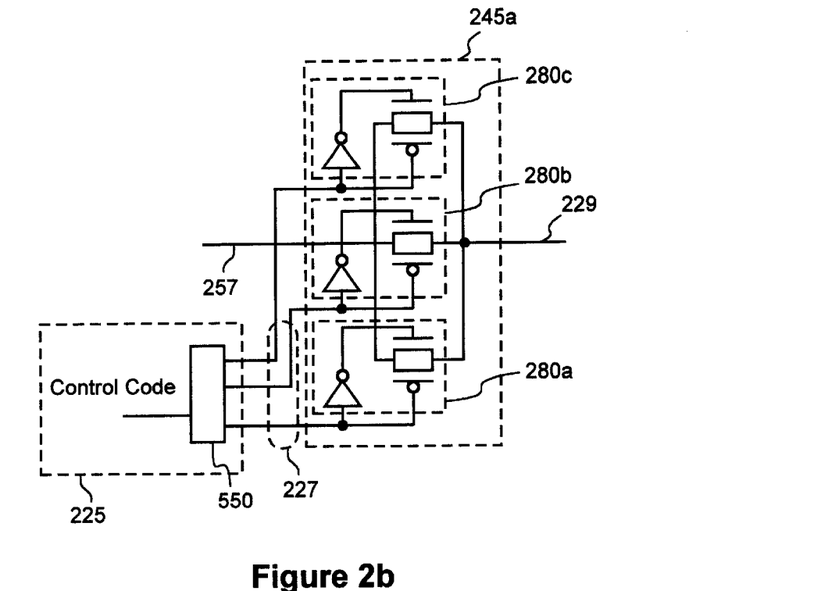
FIGS. 2b and 2c are circuit diagrams of a first embodiment and a second embodiment of a termination element in accordance with the present invention.
Figure 2C:
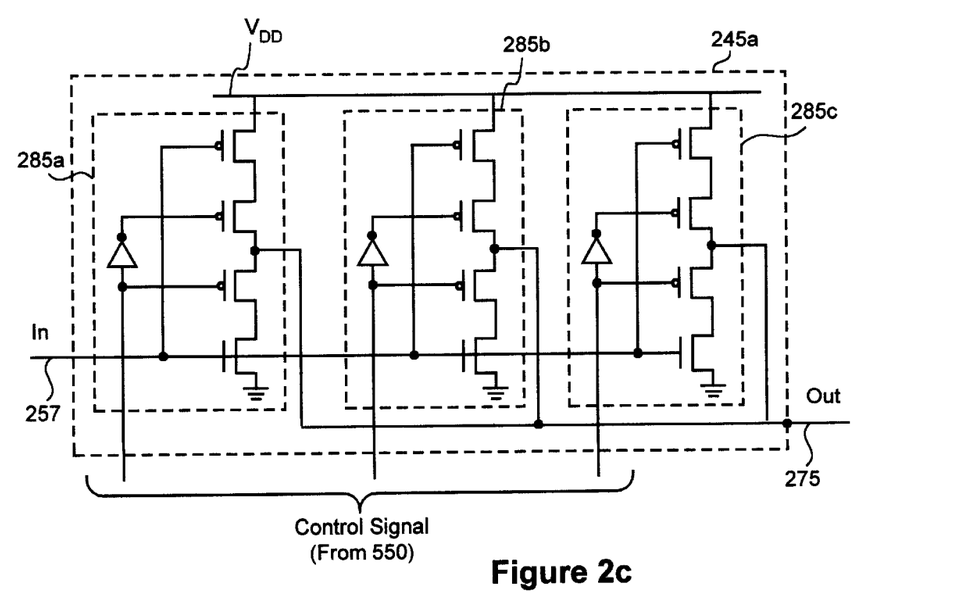

Referring to FIGS. 2b and 2c, circuit diagrams illustrate a first embodiment and a second embodiment of a termination element, eg., 245a, 255a, in accordance with the present invention. It is noted that the termination elements 245 in the driver system 215 are functionally equivalent to the termination elements 255 in the receiving system 220. For simplicity the termination elements 245, 255 will be discussed with respect to a termination element, e.g., 245a, in the driver system. One skilled in the art will understand that the principles of operation are consistent for the other termination elements.

The termination element, e.g., 245a, includes one or more transfer gate systems (conduction elements), e.g., 280a, 280b, 280c (generally 280). Each transfer gate system 280 includes a transfer gate element and an inverter. Each transfer gate element is comprised of one or more transistors, such as a BJT or a MOSFET transistor. For example, the transfer gate element may include a p-channel FET transistor and an n-channel FET transistor coupled to the inverter.

Each transfer gate system 280 of the termination element, e.g. 245a, couples to the driver (or receiver), e.g., 240, of the driver (or receiver) system, e.g., 215, through the driver (or receiver) signal line, e.g., 257. Each transfer gate of the termination element, e.g. 245a, also couples to the feedback control system 225 and to the ½ $V_{DD}$ supply voltage rail 229.

FIG. 2c is a second embodiment of the termination element, e.g., 245a, in accordance with the present invention. The second embodiment of the termination element, e.g., 245a, also includes one or more transfer gate systems 285. Each transfer gate system 285 includes an inverter that couples to a series of MOSFET transistors. Each transfer gate system 285 couples to the driver (or receiver) 240 through driver (or receiver) signal line 257. Each transfer gate system 285 also couples to the feedback control system 225 through the feedback signal line 227. In addition, the second embodiment of the termination element, e.g., 245a, illustrates an embodiment in which each transfer gate system 285 couples to the electrical transmission signal line 275.

It is noted that the values of the parallel conductance elements (e.g., output transistors of the transfer gate systems) illustrated in FIGS. 2b and 2c are chosen so that the total conductance of the termination element, e.g., 245, 255, may be adjusted to within a 5% error from a nominal value. The nominal value may be, for example, reference resistance value, $R_{ref}$. In one embodiment, a conductance element may be 60% of the nominal value and a remaining fifteen conductance elements may be 6% of the nominal value. This provides an adjustable range of 60% to 150% with a relative error of 5% at a maximum. Switches of the transfer gate systems are controlled by a thermometer code generator that provides an x bit code to obtain a monotonic change in the conductance. Embodiments of a thermometer code generator are further described below with regard to FIGS. 5 and 7.

It is also noted that the conductance of the termination elements, e.g., 245, 255, may, in one embodiment, be between $0.6(1/R_{ref})$ to $0.06(1/R_{ref})$, where $R_{ref}$ is a reference resistance value that is substantially matching an impedance of the electrical transmission signal line. It is understood that the conductance of the termination elements may be varied, if necessary, based on, for example, desired efficiency or accuracy.

Figure 3:
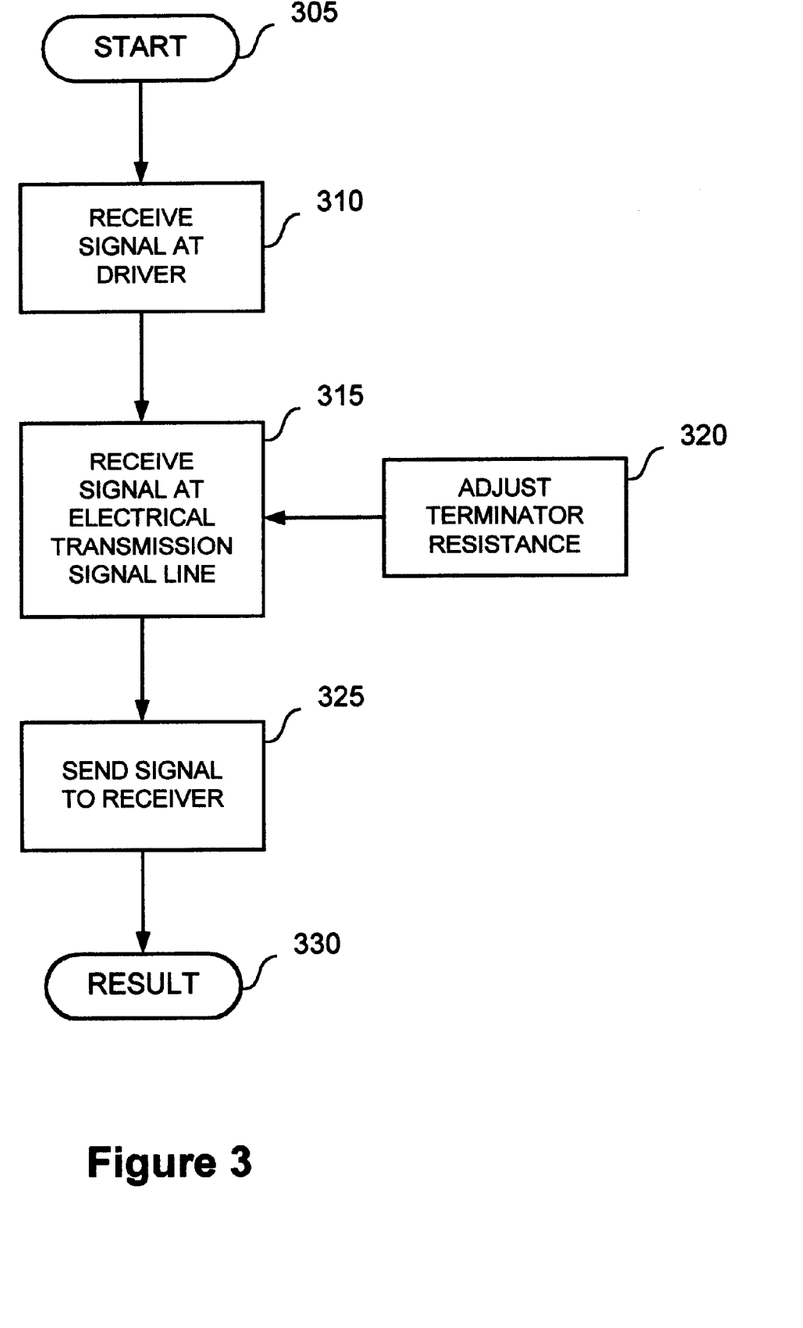
FIG. 3 is a flow diagram of one embodiment of a process for operating the termination systems of the electrical transmission system in accordance with the present invention.

FIG. 3 is a flow diagram of one embodiment of a process for operating the termination systems of the electrical transmission system 201 in accordance with the present invention. For simplicity the process will be described with respect to a driver system, e.g., 215a, that couples to a corresponding receiver system, e.g., 220a (generally 220). One skilled in the art should recognize that the principles of operation are consistent for other driver systems, e.g., 215n, that correspond to the respective receiver systems, e.g., 220n.

At the start 305 of operation, the driver system 215a of the driving system 203 receives an input signal. Specifically, the input signal is received 310 by the driver 240a through the input signal line 217. The driver 240a drives the signal through the first and the second driver signal lines 257a, 257b. As the electrical transmission signal lines 275a, 275b receive 315 the signal from the driver signal lines 257a, 257b, the first and the second terminators 245a, 245b adjust 320 their resistance value accordingly.

In particular, the terminators 245a, 245b adjust 320 their resistance value to substantially match the line characteristic impedance of the electrical transmission signal lines 275a, 275b. Specifically, the reference resistance system 213 provides a resistance value, e.g., $R_{ref}$, that is substantially equivalent to the impedance, e.g., Z, of the electrical transmission signal lines 275. The feedback control system 225 compares the resistance of the reference resistance system 213 to an on-chip resistance value that may vary.

If the comparison finds that the on-chip resistance value is less than the reference resistance system resistance value, the feedback control system generates an adjustment signal to turn off one or more of the transfer gate systems, e.g., 280, 285, in the termination elements 245a, 245b. Turning off one or more of the transfer gate systems e.g., 280, 285 increases the on-chip resistance value of the terminator elements 245a, 245b so that the resistance value of the terminator elements 245a, 245b substantially match the line characteristic impedance of the electrical transmission signal lines 275a, 275b.

If the comparison finds that the on-chip resistance value is greater than the reference resistance system resistance value, the feedback control system generates an adjustment signal to turn on one or more of the transfer gate systems e.g., 280, 285, in the termination elements 245a, 245b. Turning on one or more of the transfer gate systems e.g. 280, 285, decreases the on-chip resistance value of the terminator elements 245a, 245b so that the resistance value of the terminator elements 245a, 245b substantially match the line characteristic impedance of the electrical transmission signal lines 275a, 275b.

With the resistance value of the terminator elements 245a, 245b substantially matching the line characteristic impedance of the electrical transmission signal lines 275a, 275b, the drive signal is sent 325 across the electrical signal transmission lines 275a, 275b to the receiving system 207. The result 330 is that the drive signal is transmitted from a driving system 203 to a receiving system 207 with increased efficiency and accuracy.

The drive signal is received in the receiving system 207 by the receiver system, e.g., 220a, that is coupled with the corresponding driver system, e.g., 215a. Specifically, each terminator 255a, 255b in the receiver system 220 receives the drive signal from the corresponding terminator 245a, 245b that is respectively coupled to the other end of the electrical transmission signal line 275a, 275b.

The receiving system 207 includes a feedback control system 230 similar to the feedback control system 225 in the driving system 203. Similar to the feedback control system 225 in the driving system 203, the feedback control system 230 of the receiving system 207 uses a reference resistance system 216 to generate an adjustment signal.

As with the feedback control system 225 in the driving system 203, the feedback control system 230 in the receiving system 207 generates an adjustment signal to turn off transfer gates in the termination elements 255 when the on-chip resistance value is less than the reference resistance system 216 resistance value. Likewise, the feedback control system 230 generates an adjustment signal to turn on transfer gates in the termination elements 255 when the on-chip resistance value is greater than the reference resistance system 216 resistance value. Therefore, the resistance value of the termination elements 255 of the receiving system 220 may substantially match the line characteristic impedance of the electrical transmission signal lines 275. This also beneficially maintains efficiency and accuracy of the electrical signal, e.g., drive signal.

Figure 4:
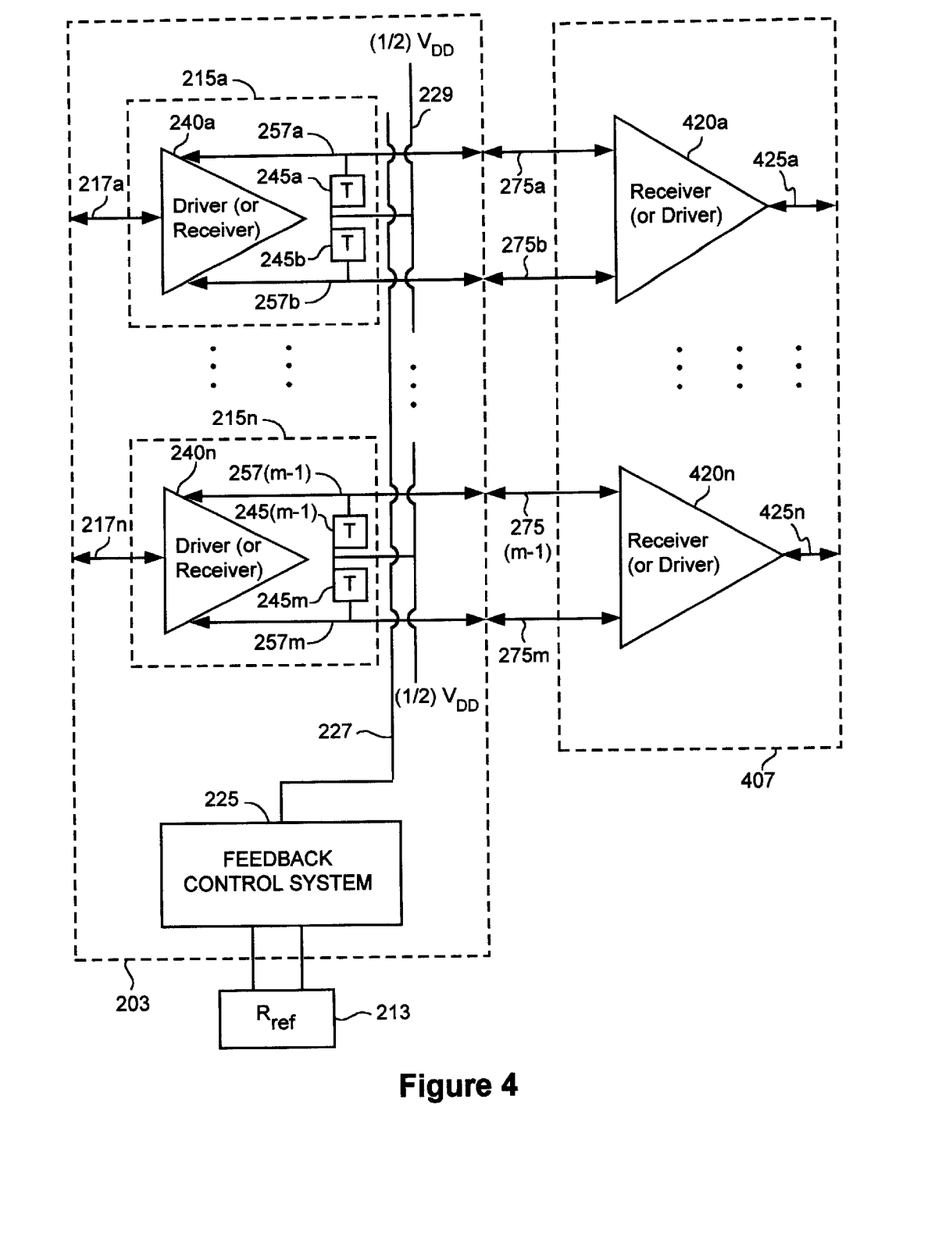
FIG. 4 is a block diagram of an alternative embodiment of a termination system in an electrical transmission system in accordance with the present invention.

FIG. 4 is a block diagram of a second embodiment of a termination system in a second embodiment of an electrical transmission system 401 in accordance with the present invention. The second embodiment of the electrical transmission system 401 includes a first electrical system, for example, the first electrical system 203, a second electrical system 407, and one or more electrical signal transmission lines, for example, electrical transmission signal lines 275a-275m (generally 275). The first electrical system 203 couples to the second electrical system 407 through the electrical transmission signal lines 275.

The second electrical system 407 of the second embodiment of the electrical transmission system 401 may operate in a receiver mode to receive an electrical signal from a driving device. The second electrical system 407 may also operate in a driver mode to drive an electrical signal to a receiving device. The second electrical system includes one or more receivers (or drivers, depending on the operating mode) 420a, 420n (generally 420). Each receiver (or driver) 420 includes one or more inputs that are coupled to the electrical transmission signal lines 275. Each receiver (or driver) 420 also includes an output (or input) signal line 425a, 425n (generally 425) to transmit electrical signals out of or into the receiver (or driver) 420, depending on the operating mode of the second electrical system 407.

Operation of the second embodiment of the electrical transmission system 401 in FIG. 4 can be described using, for example, the first electrical system 203 as a driving system and the second electrical system 407 as the receiving system. The first electrical system 203 drives an electrical input signal through each driver system 240 to the electrical transmission signal line 275, as described above in FIGS. 2a-2c and 3.

In particular, as the electrical signal is transmitted through the driver/receiver signal lines 257 to the electrical transmission signal line 275, the feedback control system 225 adjusts the resistance value of the termination elements 245 using the adjustment signal. Specifically, the resistance value of the termination elements 245 substantially matches the line characteristic impedance of the electrical transmission signal lines 275. This increases the accuracy of the transmitted electrical signal and improves the efficiency of the electrical transmission system 401.

The second electrical system 207 does not include termination elements to receive the electrical signals from the electrical transmission signal lines 275. However, the electrical signals may still be received through the inputs of the receiver 420 so that they may be sent out of the receiver 420 along the receiver output signal line 425.

The second embodiment of the electrical transmission system 401 may also operate in an opposite signal flow. For example, the second electrical system 407 may operate in a driving mode. Thus, electrical signals are received by the driver 420 through the input signal line 425. The driver 420 drives the electrical signals across the electrical transmission signal lines 275. The first electrical system 203, operating in a receiving mode, receives the electrical signals through the driver/receiver signal lines 257.

As the signal is received, the resistance value of the termination elements 245 is adjusted by the feedback control system 225 to match the line characteristic impedance of the electrical transmission signal lines 275, as is described above. This increases the accuracy of the receiving signal and increases the overall efficiency of the electrical transmission system 401. The receiver 240 then receives the electrical signal and sends it out through the output signal line 217.

Figure 5:
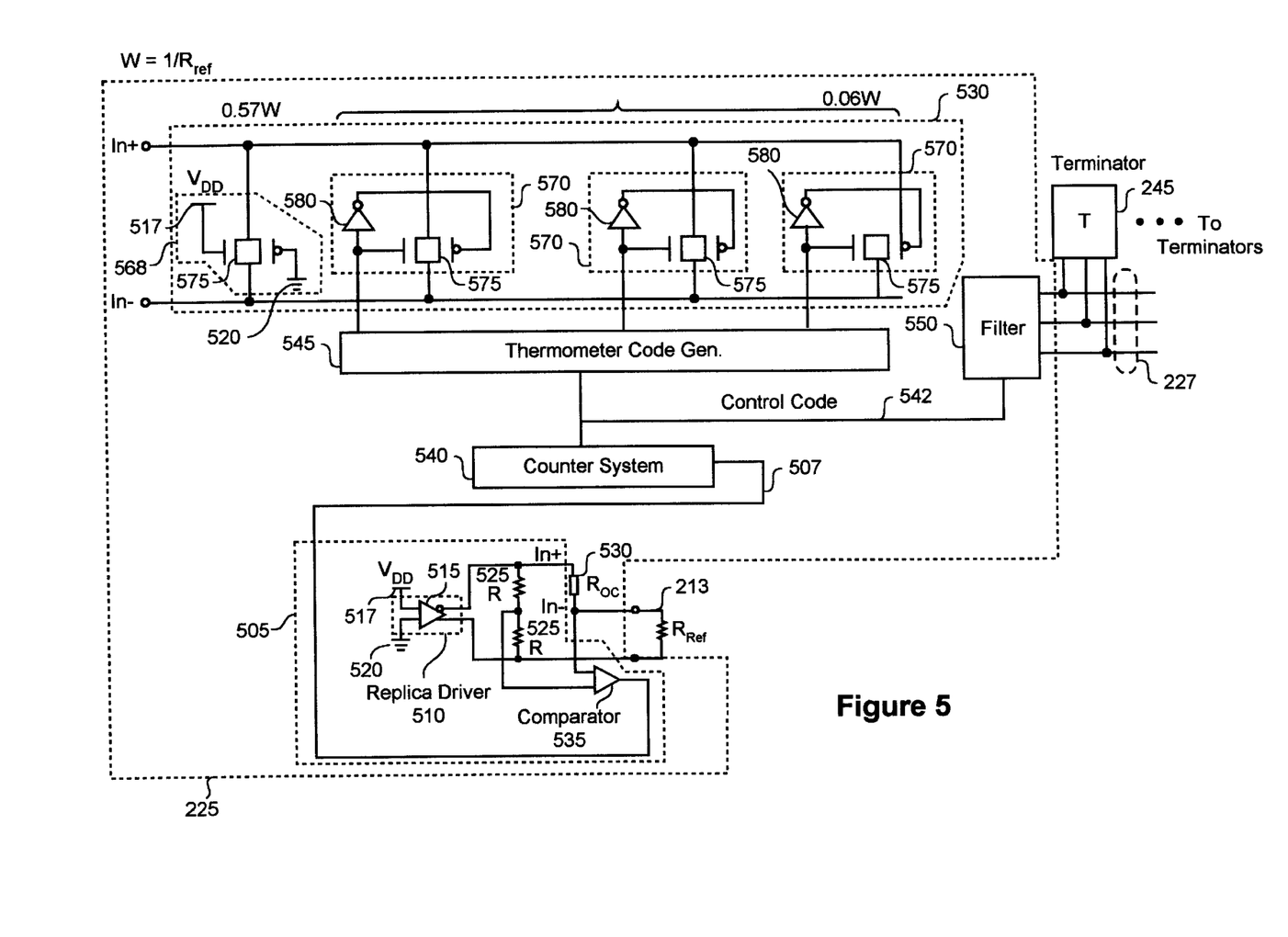
FIG. 5 is a block diagram of one embodiment of a feedback control system in accordance with the present invention.

Turning now to FIG. 5, a block diagram illustrates one embodiment of a feedback control system, e.g., 225, 230, in accordance with the present invention. The feedback control system will be described with respect to the feedback control system 225 of the first electrical system 203. It is to be understood that the principles of operation apply to the feedback control system 230 of the second electrical system 207.

The feedback control system 225 includes a comparison system 505, a comparison signal line 507, a variable on-chip resistance system 530, a counter system 540, a control code signal line 542, a thermometer code generator 545, and termination control code filter 550. The comparison system 505 couples to the reference resistance system, e.g., 213, 216 and the variable on-chip resistance system 530. The comparison system 505 also couples to the counter system 540 through comparison signal line 507.

The counter system 540 couples to the termination code filter 550 through the control code signal line 542. The counter system 540 also couples to the thermometer code generator 545. The thermometer code generator couples to the variable on-chip resistance system 530. The termination code filter 550 also couples to the feedback (adjustment) signal line 227. In addition, the feedback signal line 227 couples to the termination elements 245.

The variable on-chip resistance system 530 includes at least one transfer gate system 570, for example, three transfer gate systems. Each transfer gate system 570 includes an inverter 580 coupled with an n-channel of a transfer gate 575 on one end and a p-channel of a transfer gate on the other end. The transfer gate systems are tied together with a grounded transfer gate system 568. An n-channel of the grounded transfer gate system 568 is tied to a supply voltage rail 517, which has a voltage of $V_{DD}$. A p-channel of the grounded transfer gate system 568 is tied to a ground 520.

The comparison system 505 includes a replica driver 510, a pair of resistors 525a, 525b, and a comparator 535. The replica driver 510 of the comparison system 505 includes an amplifier 515 with at least one inverted output. The amplifier 515 couples to the voltage supply rail 517 and the ground 520. The inverter of the amplifier 515 couples to a first end of the first resistor 525a and to one end of the grounded transfer gate system 568. Another output from the amplifier 515 couples to a first end of the second resistor 525b and to one end of the reference resistance system 213.

The second end of the first resistor 525 and the second end of the second resistor 525b couples to an input of the comparator 535. Another end of the reference resistance system 213 and another end of the grounded transfer gate system 568 couple to another input of the comparator 535. It is noted that in a preferred embodiment the reference resistance system 213 is off-chip, although alternatively it may be on-chip.

The variable on-chip resistance system 530 is similar to the termination elements, e.g. 245, 255. The variable on-chip resistance system 530 provides a varying resistance value representative of the on-chip resistance. The conductance of the variable on-chip resistance system 530 in one embodiment is 0.57(1/R$_{ref}$) (or 0.57W) by the grounded transfer gate system 568 and is 0.06(1/R$_{ref}$) by the last transfer gate system 570. The comparison system 505 compares the resistance value of the variable on-chip resistance system to the resistance value of the reference resistance system 213. The resistance value of the reference resistance system 213 is selected to substantially match the line characteristic impedance of the electrical transmission signal line 275.

It is noted that in one embodiment, to obtain desired conductance values for the termination elements, e.g., 245, and the on-chip resistance system 530, conductance values are accordingly calculated. For example, for a conductance value for a termination element, e.g., 245, a conductance value of each transfer gate system, e.g., 280 is calculated. In particular, $$G(n)=G0+(n)(G1),$$

where G is the conductance of a transfer gate system and n identifies which transfer gate system (for example, n=0 is the first transfer gate system and n−1 is the last transfer gate system in a termination element having n transfer gate systems). Moreover, conductance of each transfer gate is a value of 1/R$_n$, where R$_n$ is a resistance value of the particular transfer gate system.

To obtain a value for a conductance for the on-chip resistance system 530, similar types of calculations may be performed. For example, a value of the on-chip conductance element is compared with a conductance, G$_{ref}$, of the reference resistance system 213. A value of the on-chip conductance may be calculated by, for example, $$GR(n)=(G0-0.5(G1))+n(G1),$$

where GR is the conductance of the on-chip resistance system 530 and Gx is the conductance of an xth transfer gate system (x being an integer value) and n identifies a particular transfer gate system (for example, n=0 is the first transfer gate system and n−1 is the last transfer gate system in a termination element having n transfer gate systems).

The termination adjustment system identifies a value of n that satisfies $$GR(n)<G_{ref}<GR(n+1).$$

Once G(n) is subtracted from the above expression, −(0.5)G1<G$_{ref}$−G(n)<0.5(G1). Therefore, the relative error is less than (0.5)(G1) when the conductance element for the terminator is set at G(n). A worst case relative error occurs when n=0 (i.e., G(n)=G0), and its value is G1/(2G0). For example, if G0 is 60% of the nominal conductance and G1 is 6% of the nominal conductance, there is a 5% maximum relative error.

Figure 6:
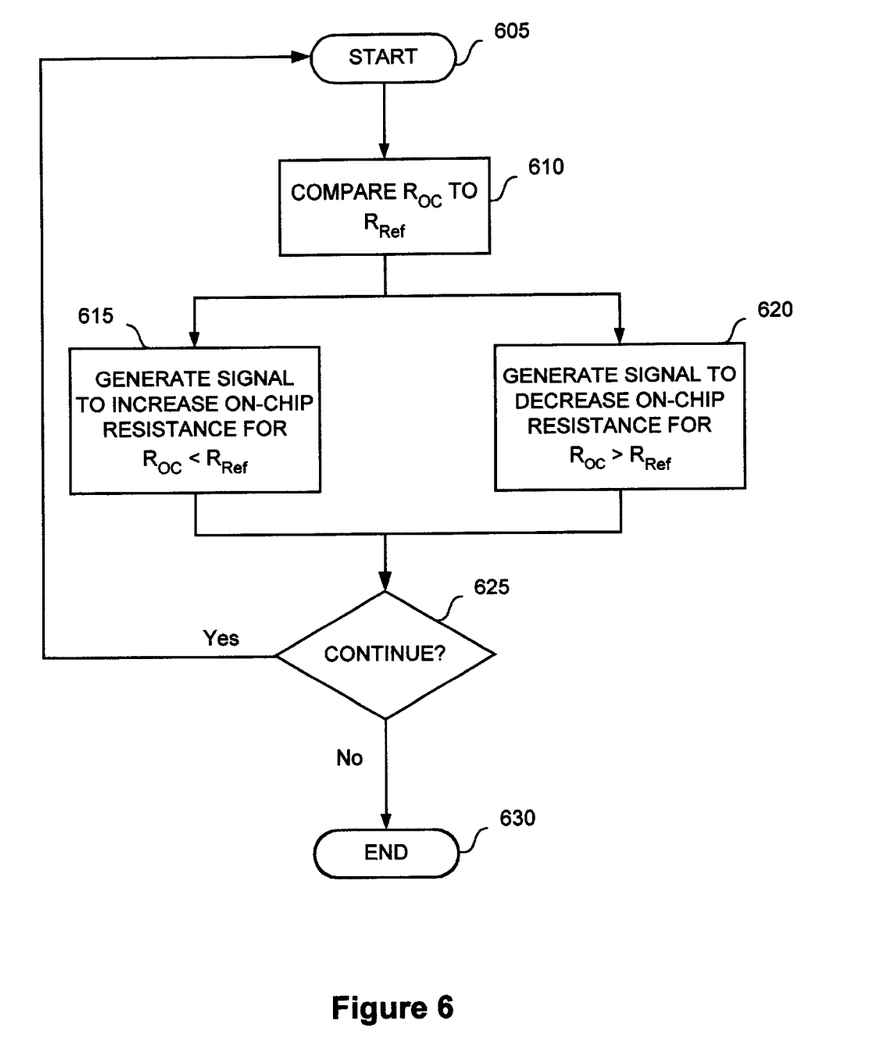
FIG. 6 is a flow diagram of one embodiment of a process for generating a control code in a feedback control system in accordance with the present invention.

FIG. 6 illustrates a flow diagram of one embodiment of a process for generating a control code in the feedback control system 225 in accordance with the present invention. When the feedback control system 225 starts 605 operation, the replica driver 510 generates a drive voltage of a high voltage and a low voltage. This allows the remainder of the comparison system 505 to compare 610 the resistance value (R$_{oc}$) of the variable on-chip resistance system 530 to the resistance value (R$_{ref}$) of the reference resistance system 213 in the comparator 535. The reference value, (R$_{ref}$), is selected to be substantially equivalent to the line characteristic impedance, Z, of the electrical transmission signal line 275.

Once the process compares the resistance value of R$_{oc}$ and R$_{ref}$, the process generates 615 a signal to increase on-chip resistance if R$_{oc}$ is less than R$_{ref}$ or the process generates 620 a signal to decrease on-chip resistance if R$_{oc}$ is greater than R$_{ref}$. Increasing or decreasing on-chip resistance accordingly allows the resistance value of the termination elements 245 to substantially match the line characteristic impedance of the electrical signal line 245. The process continues 625 with the first electrical system 203 transmitting electrical signals to the second electrical system 207 (or vice versa), until the process is ended 630.

Looking again at FIG. 5, if the comparison process determines that on-chip resistance must be increased, the comparator 535 generates a down (downward) signal. If the comparison process determines that the on-chip resistance must be decreased, the comparator 535 generates an up (upward) signal. The up or down signal from the comparator 535 is sent out of the comparison system 505 through the comparison signal line 507. The up or down signal is received by the counter system 540. The counter system 540 is a conventional counter system. In a preferred embodiment, the counter system 540 is a 4-bit up/down counter. The counter system 540 either increments a counter in response to receiving the up signal from the comparison system 505 or decrements the counter in response to receiving the down signal from the comparison system 505.

When the counter system 540 receives an up signal (or down signal) and increments (or decrements) the counter, the counter system 540 transmits a control code signal indicating the increment (or decrement) in the counter. The control code is transmitted along the control code signal line 542 to the termination control code filter 550. The termination control code filter 550 receives successive control code signal values and filters out the lower value. Using the lower value of the successive control code values, the termination control code filter 550 generates or produces an adjustment signal.

Figure 7:
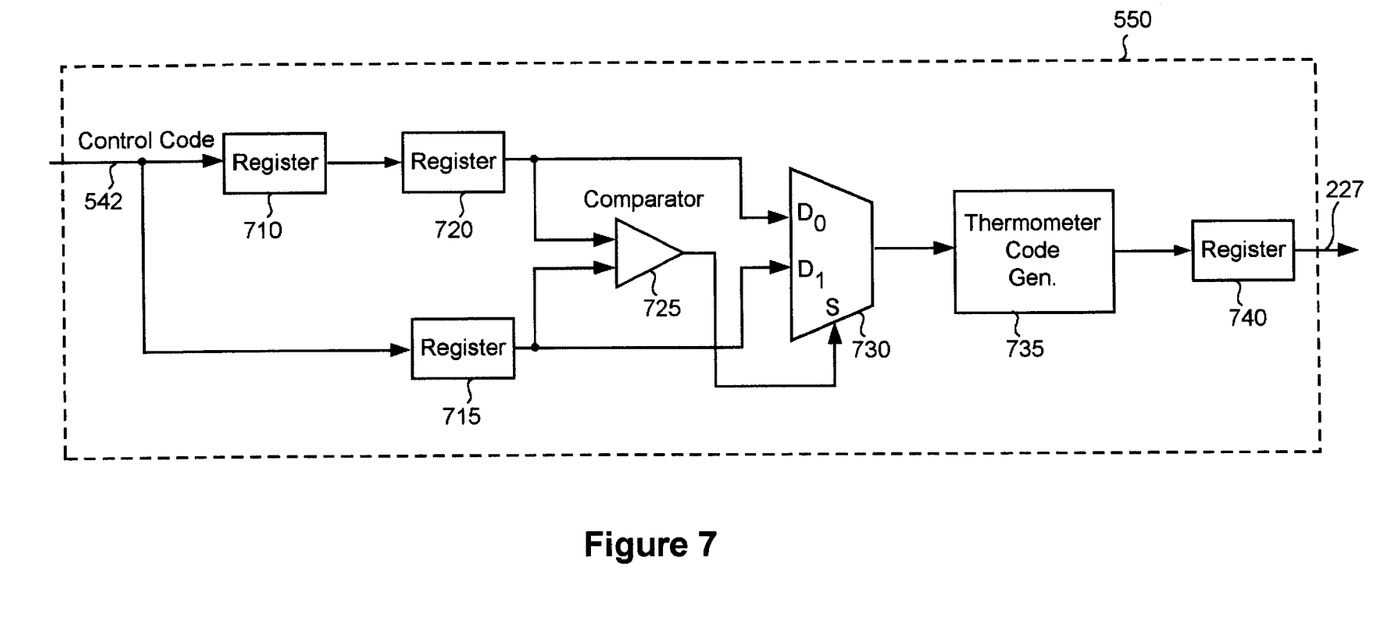
FIG. 7 is a block diagram of a termination control code filter system in accordance with the present invention.

FIG. 7 is a block diagram of a termination control code filter system 550 in accordance with the present invention. The termination control code filter system 550 includes a first register 710, a second register 715, a third register 720, a fourth register 740, a comparator 725, a multiplexer 730, and a thermometer code generator 735. The first and the second register 710, 715 are coupled to the control code signal line 542. The first register 710 is also coupled to the third register 720. The second register 715 and the third register 720 are coupled to the comparator 725. The second register 715, the third register 720, and the comparator 725 are also coupled to the multiplexer 730. The multiplexer 730 is coupled to the thermometer code generator 735. The thermometer code generator 735 is coupled to the fourth register 740. The fourth register 740 is coupled to the feedback signal line 227.

The registers 710, 715, 720, 740 are conventional registers. The comparator 725 is a conventional comparator. The multiplexer 730 is a conventional multiplexer. The thermometer code generator 735 is a conventional thermometer code generator. The x-bit, e.g., 4-bit, control code signal from the counter system 540 is received by the termination control code filter 540. Specifically, bits are received at the first register 710 and the second register 715. The bits of the control code signal are sent from the first register 710 to the third register 720.

Subsequently, another set of bits of the control code signal follows and is received by the first register 710 and the second register 715. These bits are also sent to the third register 720 by the first register. Before receiving this most recent control code signal, the third register 720 sends the previous control code bits to the comparator 725 and the multiplexer 730. The comparator 725 and the multiplexer 730 also receive the most recent control code signal from the second register 715.

The comparator 725 compares the previous control code bits with the most recent control code bits and generates a signal to select (S) the lesser value of the two sets of bits for output from the multiplexer 730. This is the value used as the adjustment signal. For example, if the first set of bits are a value of 11 and the second set of bits are a value of 13, the set of bits having the value of 11 are selected. The lesser value bits are selected because these bits provide a low relative resistance error for the termination elements. For example, having a 5% conductance error (e.g., as described above with regard to FIGS. 2b and 2c) for the termination elements, e.g., 245, 255, ensures that the on-chip resistance value of the termination elements substantially matches the line characteristic impedance of the electrical transmission signal lines 275.

The lesser value control code, or the adjustment signal, is received by the thermometer code generator 735. The thermometer code generator 735 allows y number of bits to be incremented (or decremented) at any one time when it receives an x-bit signal, where both x and y are integer values. For example, the thermometer code generator 735 may be programmed to increment only one bit at a time when it receives a four-bit adjustment signal and generates a 15-bit output signal.

Changing one bit at a time using the thermometer code generator 735 provides a type of guarantee against a signal glitch. An example of signal glitch is changing a binary signal value from 0-0-1-1 to 0-1-1-1 before changing to 0-1-0-0. The thermometer code generator 735 helps to avoid this by providing a mechanism and process to change only one bit value at a time. For example, if the thermometer code generator 735 receives a four-bit signal such as 0-0-1-1, the thermometer code generator outputs a 15-bit signal that comprises 0-0-0-0-0-0-0-0-0-0-0-1-1-1.

Once the bits are incremented or decremented, the bits of the adjustment signal from the thermometer code generator 735 are sent to the fourth register 740. The fourth register 740 sends them through the feedback (adjustment) signal line 227 to the termination elements 245.

Referring back to FIG. 5, the adjustment signal accordingly turns on or off the transfer gates e.g., 280, 285, of the termination elements 245 depending on whether there should be an increase or decrease in the resistance value. For example, the adjustment signal will correspond to the up signal and will turn on transistors of the transfer gates in the termination elements 245. Turning on the transistors of the transfer gates in the termination elements 245 decreases the resistance value of the on-chip resistance so that it substantially matches the line characteristic impedance of the electrical signal line 275.

Similarly, the adjustment signal corresponds to the down signal to increase resistance values by turning off transistors of the transfer gates in the termination elements 245. Turning off the transistors of the transfer gates in the termination elements 245 increases the resistance value of the on-chip resistance so that it substantially matches the line characteristic impedance of the electrical signal line 275.

The control code signal is also sent to the thermometer code generator 545. The thermometer code generator 545 is a conventional thermometer code generator. The thermometer code generator allows a set number of bits to be incremented (or decremented) at any one time in an x-bit signal, where x is an integer value. For example, the thermometer code generator 545 may be programmed to increment (or decrement) only one bit at a time when it receives a four-bit control code signal. By incrementing (or decrementing) only one bit at a time, the thermometer code generator 545 transmits the control code signal to the on-chip resistance system 530.

If the on-chip resistance system 530 receives the incrementing control code from the thermometer code generator 545, it turns on its transfer gate systems 570 to decrease its resistance value. If the on-chip resistance system 530 receives the decrementing control code from the thermometer code generator 545, it turns off its transfer gate systems 570 to increase its resistance value.

The present invention allows for signal transmission having increased quality and accuracy because the on-chip resistance value of the termination elements can be advantageously matched to the line characteristic impedance of the electrical signal lines coupled to the terminators. Moreover, the present invention increases overall system speed and efficiency because electrical signals do not need to be retransmitted due to a degradation in signal quality or a decrease in signal accuracy.

Further, the present invention increases system configuration flexibility because chips may be coupled with varying supplying voltages without compromising data reliability, accuracy, and efficiency. In addition, the present invention advantageously operates in high chip speed and high chip temperature environments because resistance values can be adjusted accordingly so that signal quality and accuracy is maintained.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A termination system for use in a transmission system having a driver system, the transmission system for transmitting an electrical signal along an electrical signal line, the termination system comprising:

a termination element, coupled to the driver system and the electrical signal line, for gating the electrical signal to the electrical signal line;

a reference resistance system for providing a resistance value substantially equivalent to a line characteristic impedance of the electrical signal line;

a feedback control system, coupled to the reference resistance system and the termination element, for generating a control signal to adjust a resistance of the termination element to match the line characteristic impedance of the electrical signal line;

a comparison system, including a variable on-chip resistor, the comparison system coupled to the reference resistance system, for comparing a resistance value of the variable on-chip resistor to the resistance value of the reference resistance system and generating a comparison signal;

a counter system, coupled to the comparison system, for generating a control code in response to receiving the comparison signal; and a termination code control filter, coupled to the counter system and the termination element, for generating a control signal in response to receiving the control code.

2. The termination system in claim 1, further comprising:
a termination voltage rail, coupled to the termination element, for supplying power to the termination element.

3. The termination system in claim 1, wherein the comparison system further comprises:
a replica driver, coupled to the reference resistance system and the variable on-chip resistor, for generating a supply voltage signal, the variable on-chip resistor having the resistance value in response to receiving the supply voltage signal;
at least one comparison resistor coupled to the replica driver and the reference resistance system; and
a comparator, coupled to the variable on-chip resistor, the at least one comparison resistor, the replica driver, and the reference resistance system, for comparing the resistance value of the variable on-chip resistor to the resistance value of the reference resistance system.

4. The termination system in claim 1, wherein the comparison system generates an up signal in response to the resistance value of the variable on-chip resistor having a value greater than the resistance value of the reference resistance system and generates a down signal in response to the resistance value of the variable on-chip resistor having a value less than the resistance value of the reference resistance system.

5. The termination system in claim 1, wherein the counter system increments the control code in response to the comparison signal indicating that the resistance value of the variable on-chip resistor is greater than the resistance value of the reference resistor.

6. The termination system in claim 1, wherein the counter system decrements the control code in response to the comparison signal indicating that the resistance value of the variable on-chip resistor is less than the resistance value of the reference resistor.

7. The termination system in claim 1, wherein the feedback control system further comprises a thermometer code generator, coupled to the counter system, for changing a single bit of the control code at time instance.

8. A feedback control system to match a resistance value of a termination element to a line characteristic impedance of an electrical signal line, the feedback control system comprising:
a comparison system, including a variable on-chip resistor, the comparison system coupled to a reference resistance system, for comparing a resistance value of the variable on-chip resistor to the resistance value of the reference resistance system and generating a comparison signal;
a counter system, coupled to the comparison system, for generating a control code in response to receiving the comparison signal; and
a termination code control filter, coupled to the counter system and the termination element, for generating a control signal in response to receiving the control code.

9. The feedback control system in claim 8, wherein the comparison system further comprises:
a replica driver, coupled to the reference resistance system and the variable on-chip resistor, for generating a supply voltage signal, the variable on-chip resistor having the resistance value in response to receiving the supply voltage signal;
at least one comparison resistor coupled to the replica driver and the reference resistance system; and
a comparator, coupled to the variable on-chip resistor, the at least one comparison resistor, the replica driver, and the reference resistance system, for comparing the resistance value of the variable on-chip resistor to the resistance value of the reference resistance system.

10. The feedback control system in claim 8, wherein the comparison system generates an up signal in response to the resistance value of the variable on-chip resistor having a value greater than the resistance value of the reference resistance system and generates a down signal in response to the resistance value of the variable on-chip resistor having a value less than the resistance value of the reference resistance system.

11. The feedback control system in claim 8, wherein the counter system increments the control code in response to the comparison signal indicating that the resistance value of the variable on-chip resistor is greater than the resistance value of the reference resistor.

12. The feedback control system in claim 8, wherein the counter system decrements the control code in response to the comparison signal indicating that the resistance value of the variable on-chip resistor is less than the resistance value of the reference resistor.

13. The feedback control system in claim 8, wherein the feedback control system further comprises a thermometer code generator, coupled to the counter system, for changing a single bit of the control code at a time instance.

14. In an electrical signal transmission system, a method for matching a resistance of a termination element coupled with an electrical signal line with a line characteristic impedance of the electrical signal line to transmit an electrical signal along the electrical signal line, the method comprising:
generating an adjustment signal in response to a reference resistance system, the reference resistance system having a resistance substantially matched to the line characteristic impedance of the electrical signal line, the generation of the adjustment signal including evaluating the resistance of an on-chip resistance system, the on-chip resistance system comprising at least one transistor, comparing the resistance of the on-chip resistance system to the resistance of the reference resistance system, decreasing a counter in response to the resistance of the on-chip resistance system being less than the resistance of the reference resistance system, generating a down control code to turn-off at least one transistor in the on-chip resistance system, increasing the counter in response to the resistance of the on-chip resistance system being greater than the resistance of the reference resistance system, and generating an up control code to turn-on at least one transistor in the on-chip resistance system;
receiving the adjustment signal at the termination element; and
adjusting the resistance of the termination element to substantially match the line characteristic impedance of the electrical signal line in response to receiving the adjustment signal.

15. The method for matching in claim 14, wherein generating the adjustment signal further comprises:
in response to the down control code, filtering the down control code to generate the adjustment signal to increase the resistance of the termination element; and
in response to the up control code, filtering the up control code to generate the adjustment signal to decrease the resistance of the termination element.

16. In a feedback control system, a method for generating an adjustment signal for adjusting the resistance of a termination element to match a line characteristic impedance of an electrical signal line, the method comprising:

evaluating the resistance of an on-chip resistance system, the on-chip resistance system comprising at least one transistor;

comparing the resistance of the on-chip resistance system to a resistance of a reference resistance system;

decreasing a counter in response to the resistance of the on-chip resistance system being less than the resistance of the reference resistance system;

generating a down control code to turn-off at least one transistor in the on-chip resistance system;

increasing the counter in response to the resistance of the on-chip resistance system being greater than the resistance of the reference resistance system; and generating an up control code to turn-on at least one transistor in the on-chip resistance system.

17. The method for generating the adjustment signal in claim 16, further comprising:

in response to the down control code, filtering the down control code to generate the adjustment signal to increase the resistance of the termination element; and in response to the up control code, filtering the up control code to generate the adjustment signal to decrease the resistance of the termination element.

* * * * *